(12) United States Patent
Sakamoto et al.

(10) Patent No.: US 10,509,284 B2
(45) Date of Patent: Dec. 17, 2019

(54) LIQUID CRYSTAL DISPLAY DEVICE

(71) Applicant: Sharp Kabushiki Kaisha, Sakai, Osaka (JP)

(72) Inventors: Mayuko Sakamoto, Sakai (JP); Tetsunori Tanaka, Sakai (JP); Yuki Yasuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/083,551

(22) PCT Filed: Mar. 27, 2017

(86) PCT No.: PCT/JP2017/012296
§ 371 (c)(1),
(2) Date: Sep. 10, 2018

(87) PCT Pub. No.: WO2017/170350
PCT Pub. Date: Oct. 5, 2017

(65) Prior Publication Data
US 2019/0086749 A1  Mar. 21, 2019

(30) Foreign Application Priority Data

Mar. 30, 2016 (JP) .................................. 2016-069487

(51) Int. Cl.
*G02F 1/1362* (2006.01)
*G02F 1/1335* (2006.01)
*G02F 1/1343* (2006.01)

(52) U.S. Cl.
CPC .. *G02F 1/136227* (2013.01); *G02F 1/133528* (2013.01); *G02F 1/133555* (2013.01);
(Continued)

(58) Field of Classification Search
CPC ............................................... G02F 1/134363
See application file for complete search history.

(56) References Cited

U.S. PATENT DOCUMENTS

2005/0264720 A1* 12/2005 Itou .................... G02F 1/133528
349/99
2005/0264731 A1* 12/2005 Itou .................... G02F 1/133555
349/114
(Continued)

FOREIGN PATENT DOCUMENTS

JP  2008-180949 A   8/2008
JP  2010-128192   *  6/2010  ........... G02F 1/1343
(Continued)

OTHER PUBLICATIONS

Official Communication issued in International Patent Application No. PCT/JP2017/012296, dated Jun. 20, 2017.
(Continued)

*Primary Examiner* — Sang V Nguyen
(74) *Attorney, Agent, or Firm* — Keating & Bennett, LLP

(57) ABSTRACT

A liquid crystal display device according to an aspect of the disclosure includes a liquid crystal panel including an element substrate, a counter substrate facing the element substrate, a liquid crystal layer sandwiched between the element substrate and the counter substrate, an incident-side linear polarizing plate arranged on a light-incident side of the liquid crystal layer, and an emission-side linear polarizing plate arranged on a light-emission side of the liquid crystal layer. Each of the element substrate and the counter substrate uses a resin film as base material. A plurality of insulating films are formed on the base material. A contact hole is formed in the plurality of insulating films, the contact hole being rectangular in plan view. Either a long side or a short side of the contact hole is parallel with an absorption axis of the incident-side linear polarizing plate or the emission-side linear polarizing plate.

5 Claims, 14 Drawing Sheets

(52) U.S. Cl.
CPC .............. *G02F 1/134363* (2013.01); *G02F 2001/133531* (2013.01)

(56) References Cited

U.S. PATENT DOCUMENTS

| | | | |
|---|---|---|---|
| 2007/0146591 A1* | 6/2007 | Kimura | G02F 1/133345 349/114 |
| 2008/0180613 A1* | 7/2008 | Matsumoto | G02F 1/134363 349/113 |
| 2015/0168754 A1* | 6/2015 | Im | G02F 1/1339 349/85 |

FOREIGN PATENT DOCUMENTS

| | | |
|---|---|---|
| JP | 2010-128192 A | 6/2010 |
| JP | 5551543 B2 | 7/2014 |

OTHER PUBLICATIONS

Nanjo, "Materials for Display", The Society of Polymer Science, Japan (ed.) Chapter 1, pp. 9-10.

* cited by examiner

LIQUID CRYSTAL DISPLAY DEVICE

This application claims priority based on JP 2016-069487 A, filed on Mar. 30, 2016 in Japan, the content of which is incorporated herein by reference.

TECHNICAL FIELD

An aspect of the disclosure relates to a liquid crystal display device.

BACKGROUND ART

What is known as a flexible display, in which a display portion thereof can be flexibly changed in shape, has been attracting attention as a thin, light, and unbreakable display. A liquid crystal display type flexible display normally has a structure in which a liquid crystal layer is sandwiched by organic transparent resin material, such as polyimide resin. In a process for manufacturing a liquid crystal panel as a flexible display, the transparent resin material is formed into a film on a support substrate, such as glass, a TFT substrate, a liquid crystal layer, and the like are formed on the film, and then the support substrate is removed.

In general, a liquid crystal display device includes a cover member, a liquid crystal panel, a backlight unit, and the like. In a case where foreign matters happen to be inserted between the liquid crystal panel and the backlight unit in assembly of such a liquid crystal display device, light leakage occurs at a normally-black liquid crystal panel due to stress occurring at each glass substrate of the liquid crystal panel.

PTL 1 describes a configuration including a front cover, a liquid crystal panel, a backlight unit, and four support parts supporting the liquid crystal panel between the backlight unit and a cover member. Among the four support parts, each two support parts forming a pair are arranged so as to face each other; the two support parts forming one of the pairs are provided on a cover member side while the two support parts forming the other pair are provided on a backlight unit side. In this configuration, by defining the angle between the straight line passing through the respective centers of the two support parts forming the one pair and an absorption axis of one corresponding polarizing plate, light leakage of a normally black liquid crystal panel is suppressed.

CITATION LIST

Patent Literature

PTL 1: JP 5551543 B

Non Patent Literature

NPL 1: Materials for Display, The Society of Polymer Science, Japan (ed.), Kyoritsu Shuppan Co., Ltd. (publisher), Mitsuaki Nanjo, Chapter 1, pp. 9-10

SUMMARY

Technical Problem

In PTL 1, only light leakage attributable to stress externally and mechanically applied to the liquid crystal panel including a pair of glass substrates is mentioned; however, stress occurring in the interior of the liquid crystal panel is not taken into consideration.

In a case of using a resin film for a substrate of a liquid crystal panel, light leakage attributable to stress occurs only because a resin film is used as a substrate of the liquid crystal panel even though mechanical stress is not applied externally.

An aspect of the disclosure has been made in view of the above problem of the related art, and an object of the aspect is to provide a liquid crystal display device capable of suppressing stress in an interior of a liquid crystal panel occurring in a case of using a resin film for a substrate of the panel.

Solution to Problem

A liquid crystal display device according to one aspect of the disclosure includes a liquid crystal panel including an element substrate, a counter substrate facing the element substrate, a liquid crystal layer sandwiched between the element substrate and the counter substrate, an incident-side linear polarizing plate arranged on a light-incident side of the liquid crystal layer, and an emission-side linear polarizing plate arranged on a light-emission side of the liquid crystal layer. Each of the element substrate and the counter substrate uses a resin film as base material. A plurality of insulating films are formed on the base material. A contact hole is formed in the plurality of insulating films, the contact hole being rectangular in plan view. Either a long side or a short side of the contact hole is parallel with an absorption axis of the incident-side linear polarizing plate or the emission-side linear polarizing plate.

The liquid crystal display device according to the one aspect of the disclosure may be configured such that the contact hole includes a plurality of through-holes formed in the plurality of insulating films and at least one of the plurality of through-holes is formed of an inorganic film.

The liquid crystal display device according to the one aspect of the disclosure may be configured such that storage capacitance is formed in the contact hole.

A liquid crystal display device according to one aspect of the disclosure includes a liquid crystal panel including an element substrate, a counter substrate facing the element substrate, a liquid crystal layer sandwiched between the element substrate and the counter substrate, an incident-side linear polarizing plate arranged on a light-incident side of the liquid crystal layer, and an emission-side linear polarizing plate arranged on a light-emission side of the liquid crystal layer. Each of the element substrate and the counter substrate uses a resin film as base material and includes a first region and a second region different from each other in the number of a plurality of insulating films layered on the base material or film thickness of the plurality of the insulating films. An absorption axis direction of either the incident-side linear polarizing plate or the emission-side linear polarizing plate is matched with a direction in which normal stress acting on a cross section of the plurality of insulating films acts in a greatest range, the normal stress being caused by a difference in the number of the plurality of the insulating films or film thickness of the plurality of insulating films between the first region and the second region.

The liquid crystal display device according to the one aspect of the disclosure may be configured such that the first region corresponds to a contact hole formed by etching the plurality of insulating films layered on the base material to transmit a signal on a wiring line on a lower layer side to a pixel electrode on an upper layer side and the second region is a region outside the contact hole and different from the first region in the number of the plurality of insulating films or film thickness.

The liquid crystal display device according to the one aspect of the disclosure may be configured such that the first region is at least either a region corresponding to a periphery of a gate bus line and a region corresponding to a periphery of a source bus line and the second region is a region adjacent to the first region and is smaller in film thickness than the first region.

The liquid crystal display device according to the one aspect of the disclosure may be configured such that a planar shape of the contact hole seen from a plane-normal direction of the base material is rectangular, and each of sides orthogonal to each other is parallel with either the gate bus line or the source bus line.

The liquid crystal display device according to the one aspect of the disclosure may be configured such that the liquid crystal layer is in a horizontal alignment mode.

The liquid crystal display device according to the one aspect of the disclosure may be configured such that the liquid crystal layer is in a vertical alignment mode.

Advantageous Effects of Disclosure

According to an aspect of the disclosure, it is possible to provide a liquid crystal display device capable of effectively suppress light leakage in black display.

BRIEF DESCRIPTION OF DRAWINGS

FIG. 13B illustrates a table illustrating comparison between measurement values obtained under different conditions provided that each measurement value is 1 in a case of using circular polarizers, and the like.

DESCRIPTION OF EMBODIMENTS

First Embodiment

A liquid crystal display device of a first embodiment of the disclosure will be described below.

Note that in each of the drawings below, the dimensional scale may be illustrated differently depending on the component, such that each component is easily visible.

Liquid Crystal Display Device

Figure 1:
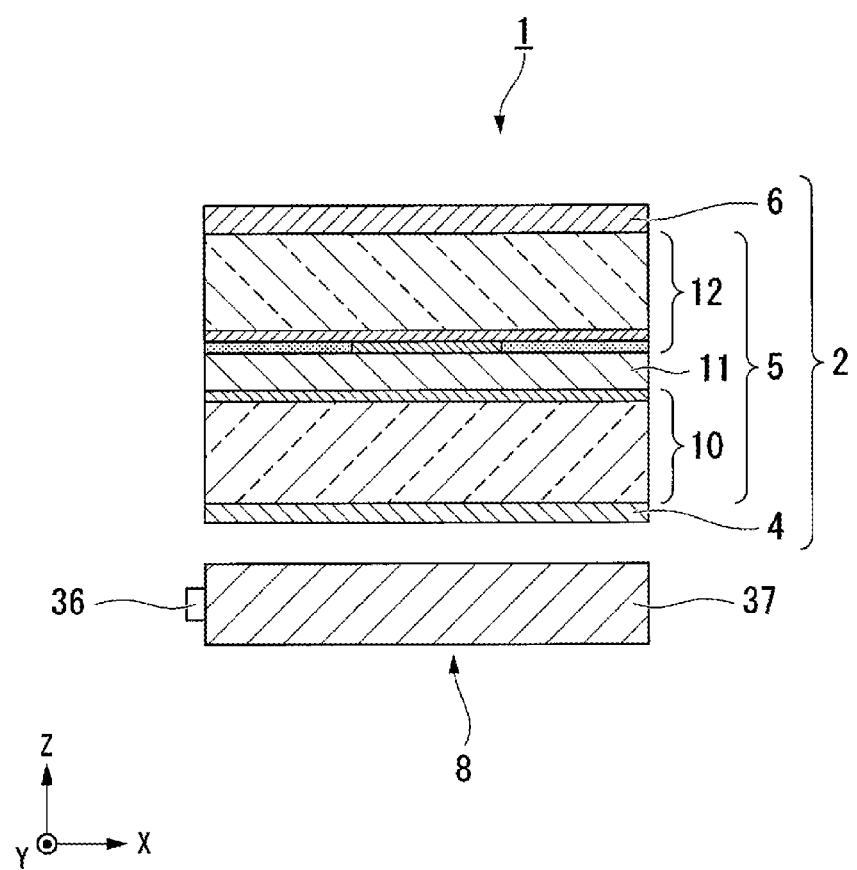
FIG. 1 is a cross-sectional view illustrating a schematic configuration of a liquid crystal display device 1 of a first embodiment.

FIG. 1 is a cross-sectional view illustrating a schematic configuration of the liquid crystal display device of the first embodiment.

As illustrated in FIG. 1, a liquid crystal display device 1 includes a liquid crystal panel 2 and a backlight unit 8. The liquid crystal panel 2 includes a liquid crystal cell 5, an incident-side linear polarizing plate 4, which is arranged on a light-incident side of the liquid crystal cell 5, and an emission-side linear polarizing plate 6, which is arranged on a light-emission side of the liquid crystal cell 5. The liquid crystal panel 2 is a so-called flexible display with a flexibly deformable display portion. Although the liquid crystal cell 5 is schematically illustrated in FIG. 1, details of the structure of the liquid crystal cell 5 will be described later.

A linear polarizing plate mass-produced by any film manufacturer can be used as material for each of the incident-side linear polarizing plate 4 and the emission-side linear polarizing plate 6. Such a linear polarizing plate is composed of a cellulose triacetate (triacetyl cellulose: TAC) film, a polyvinyl alcohol (PVA) film, a zero-retardation film with very little retardation, or the like, for example. To compensate a viewing angle, a retardation film (e.g., an A plate or a C plate) may be added in some cases.

The liquid crystal cell 5 of the present embodiment having flexibility includes components substantially the same as those of a generally known liquid crystal display but is characteristic in terms of transparent resin films being used, instead of using inorganic glass, as base material, to obtain flexibility. In the liquid crystal cell 5, a liquid crystal structure is provided between a transparent resin film substrate (base material) 14 and a transparent film substrate (base material) 29 forming a pair, the liquid crystal structure including a thin film transistor (TFT), various signal lines (scanning signal line, data signal line, and the like), pixel electrodes, a liquid crystal layer, a common electrode (counter electrode), color filters (CFs), an insulating film, and the like. A known configuration and manufacturing method can be applied to the above-described liquid crystal structure.

In the liquid crystal display device 1 of the present embodiment, light emitted from the backlight unit 8 is modulated at the liquid crystal panel 2 to display a predetermined image, characters, or the like by using the modulated light. An observer sees a display image on the liquid crystal display device 1 through the emission-side linear polarizing plate 6.

In the following description, the side on which the emission-side linear polarizing plate 6 is arranged is referred to as a viewing side, and the side on which the backlight unit 8 is arranged is referred to as a back face side.

A concrete configuration of the liquid crystal panel 2 will be described below.

Here, a description will be given by taking an active matrix type transmissive liquid crystal panel as an example. Note that, however, a liquid crystal panel applicable to the present embodiment is not limited to the active matrix type transmissive liquid crystal panel. The liquid crystal panel 2 applicable to the present embodiment may be, for example, a transflective (transmissive/reflective) liquid crystal panel. Alternatively, the liquid crystal panel 2 may be a simple matrix type liquid crystal panel in which each pixel includes no switching thin film transistor. The Thin Film Transistor is abbreviated as TFT below.

Figure 2A:
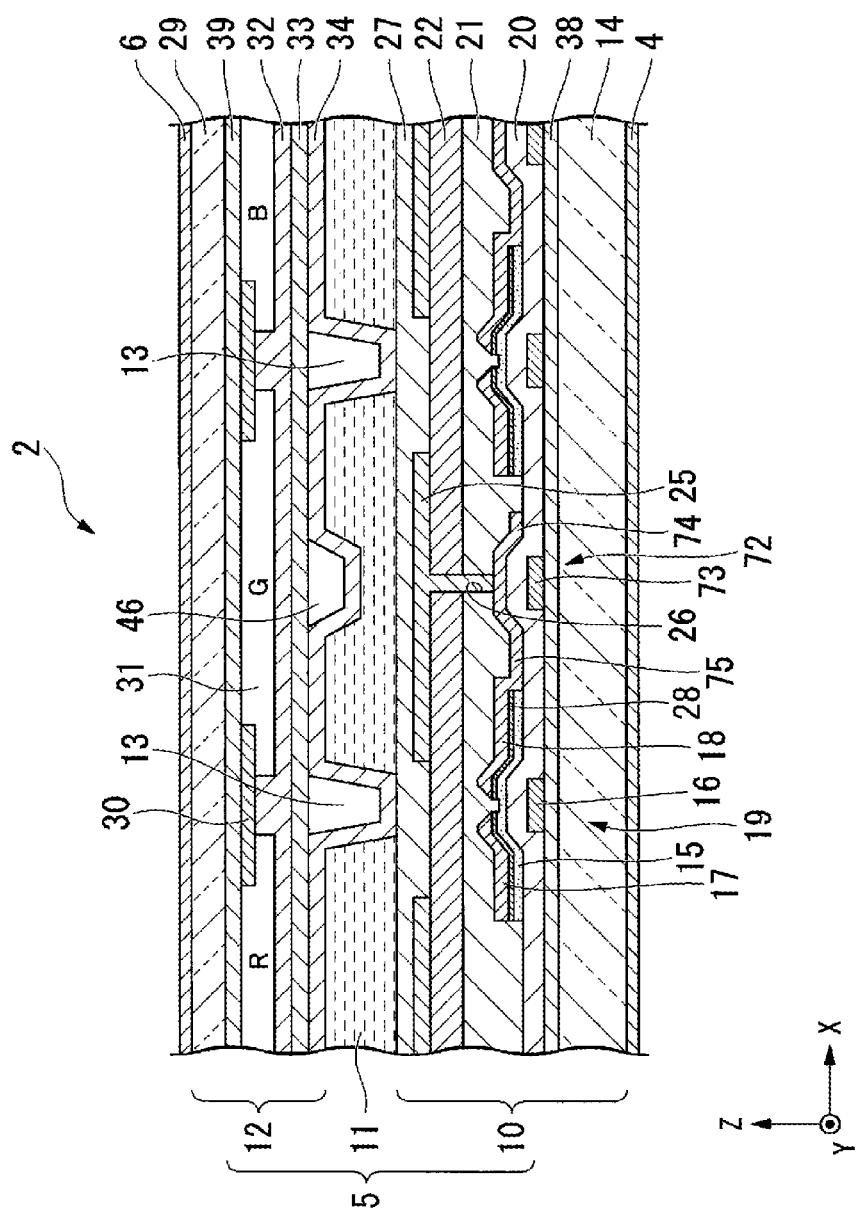
FIG. 2A is a longitudinal cross-sectional view of a display region of a liquid crystal panel 2.

FIG. 2A is a longitudinal cross-sectional view of a display region of the liquid crystal panel 2.

As described above, the liquid crystal panel 2 includes the liquid crystal cell 5, the incident-side linear polarizing plate 4, and the emission-side linear polarizing plate 6. As illustrated in FIG. 2A, the liquid crystal cell 5 includes an element substrate 10, a color filter substrate (counter substrate) 12, and a liquid crystal layer 11. The element substrate 10 functions as a switching element substrate. The color filter substrate 12 is arranged so as to face the element substrate 10. The liquid crystal layer 11 is sandwiched between the element substrate 10 and the color filter substrate 12.

The liquid crystal layer 11 is sealed in a space surrounded by the element substrate 10, the color filter substrate 12, and a sealing member (not illustrated) having a frame shape. The sealing member attaches the element substrate 10 and the color filter substrate 12 to each other with a predetermined space therebetween.

The liquid crystal panel 2 of the present embodiment performs display in a Vertical Alignment (VA) mode. Liquid crystals negative in anisotropy of dielectric constant are used for the liquid crystal layer 11. Spacers 13 are arranged between the element substrate 10 and the color filter substrate 12. Each spacer 13 is a spherical or pillar-shaped member. The spacers 13 keep a certain space between the element substrate 10 and the color filter substrate 12.

On a liquid crystal layer 11 side face of the transparent resin film substrate (base material) 14 that is part of the element substrate 10, bottom-gate TFT elements 19, each of which includes a gate electrode 16, a semiconductor layer 15, a source electrode 17, a drain electrode 18, and the like, are formed.

As the transparent resin film substrate 14, polymer material, for example, organic transparent resin material having heat resistance such as polyimide (PI) can be used. The thickness of the transparent resin film substrate 14 is approximately from 1 μm to 20 μm. This configuration allows the film thickness to be smaller than a configuration where an inorganic glass substrate having a plate thickness of 100 μm or greater is used.

On one face side of the transparent resin film substrate 14, a base coat 38 is provided. An inorganic film, for example, a silicon nitride film (SiNx), a silicon oxynitride film (SiNO), a silicon oxide film ($SiO_2$), or the like is used for the base coat 38.

The gate electrodes 16 are formed on the base coat 38. As material of the gate electrodes 16, a tungsten (W)/tantalum nitride (TaN) layered film, molybdenum (Mo), titanium (Ti), aluminum (Al), Cu, or a layered film thereof is used, for example.

A gate insulating film 20 is formed on the base coat 38 so as to cover the gate electrodes 16. As material of the gate insulating film 20, a silicon oxide film, a silicon nitride film, a layered film thereof, or the like is used, for example.

The semiconductor layer 15 is formed on the gate insulating film 20 so as to face the gate electrodes 16. The semiconductor layer 15 is composed of quaternary crystal semiconductor material including indium (In), gallium (Ga), zinc (Zn), and oxygen (O), for example. As material of the semiconductor layer 15, semiconductor material such as Continuous Grain Silicon (CGS), Low-temperature Poly-Silicon (LTPS), Amorphous Silicon (α-Si) or the like, is used as an alternative to the In—Ga—Zn—O based quaternary crystal semiconductor.

For example, in a case of using Amorphous Silicon (α-Si) as semiconductor material, contact layers 28 are formed in an upper face of the semiconductor layer 15. The contact layers are composed of material in which the same semiconductor material as that of the semiconductor layer 15 is doped with n-type impurity at a high concentration. A region, of the semiconductor layer 15, between the two contact layers is formed to be small in film thickness. The region, of the semiconductor layer 15, having a small film thickness functions as a channel region of the TFT element 19.

In a case of using, as the semiconductor material, quaternary crystal semiconductor material including, for example, indium (In), gallium (Ga), zinc (Zn), and oxygen (O), contact layers 28 in which n-type impurity is doped are not needed.

On the contact layers, the source electrodes 17 and the drain electrodes 18 are formed with an etching stopper layer 40 (FIG. 5) to be described later disposed therebetween. As material of the source electrodes 17 and the drain electrodes 18, similar conductive material to that of the above-described gate electrodes 16 is used. The etching stopper layer (insulating film) 40 protects surfaces of the contact layers 28 and the semiconductor layer 15 in forming the source electrodes 17 and the drain electrodes 18. As material of the etching stopper layer 40, an inorganic film, for example, a silicon oxide film, a silicon nitride film, or a layered film thereof is used.

On the gate insulating film 20, a first interlayer insulating film (insulating film) 21 is formed so as to cover the semiconductor layer 15, the contact layers 28, the source electrodes 17, and the drain electrodes 18. As material of the first interlayer insulating film 21, an inorganic film, for example, a silicon oxide film, a silicon nitride film, or a layered film thereof is used, similar to the etching stopper layer 40.

On the first interlayer insulating film 21, a second interlayer insulating film (insulating film) 22 is formed. As material of the second interlayer insulating film 22, an inorganic film, for example, a silicon oxide film, a silicon nitride film, a layered film thereof, or organic insulating material is used, similar to the etching stopper layer 40, and organic insulating material is used in this example.

On the second interlayer insulating film 22, pixel electrodes 25 are formed. A contact hole 26 is formed in the first interlayer insulating film 21 and the second interlayer insulating film 22 in such a manner as to penetrate the first interlayer insulating film 21 and the second interlayer insulating film 22, the contact hole 26 being opened to a surface of each storage capacitor 72 to be described later.

The corresponding pixel electrode 25 is connected to the drain electrode 18 through the corresponding contact hole 26 and a connection portion 75 to be described later. The pixel electrode 25 is connected to a drain region of the semiconductor layer 15 with the drain electrode 18 as a relay electrode. As material of the pixel electrodes 25, transparent conductive material, such as Indium Tin Oxide (ITO) or Indium Zinc Oxide (IZO), may be used, for example. A portion, of the drain electrode 18, extended above a capacitance line CL forms a second capacitance electrode 74, and the second capacitance electrode 74 forms the storage capacitor 72 together with the capacitance line CL through the etching stopper layer 40, the first interlayer insulating film 21, and the second interlayer insulating film 22 formed on the transparent resin film substrate 14.

With this configuration, a scanning signal is supplied through a scanning line, and when the TFT element 19 enters an on state, an image signal supplied to the source electrode 17 through a signal line is supplied to the pixel electrode 25 through the semiconductor layer 15 and the drain electrode 18.

A first vertical alignment film 27 is formed on the entire face of the first interlayer insulating film 21 so as to cover the pixel electrodes 25. As illustrated in FIG. 2A, a plurality of rivet structures 46 are formed in the color filter substrate 12 of the present embodiment, each of the rivet structures 46 being for controlling the alignment of the liquid crystal molecules 47. Each rivet structure 46 is arranged so as to overlap the storage capacitor 72 in plan view, the rivet structure 46 being formed in the same layer as that of spacers 13 in a similar method as that for the spacers 13. A height t of the rivet structure 46 is approximately half a thickness T of the liquid crystal layer 11.

Figure 2B:
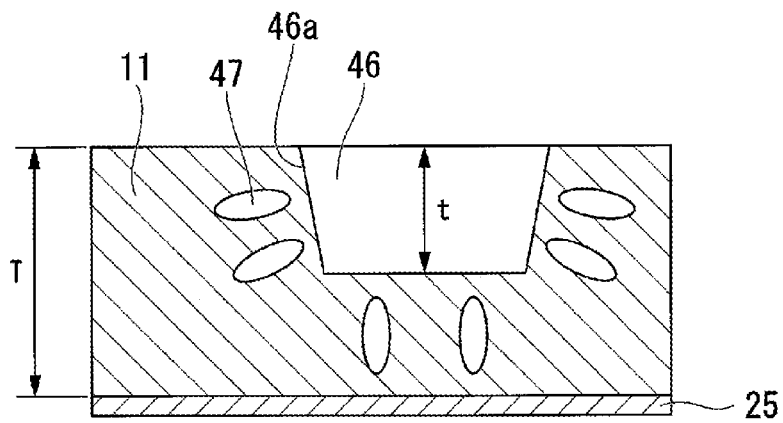
FIG. 2B is a diagram illustrating an alignment state of liquid crystal molecules 47 near a rivet structure 46.

FIG. 2B is a diagram illustrating an alignment state of the liquid crystal molecules 47 near the rivet structure 46.

In FIG. 2B, illustration of the vertical alignment films 27 and 34 is omitted.

As illustrated in FIG. 2B, the liquid crystal molecules 47 existing on a side-face side of the rivet structure 46 among the liquid crystal molecules 47 are aligned in such a manner that the major axis is substantially orthogonal to an inclined face. In contrast, the liquid crystal molecules 47 existing between the rivet structure 46 and the pixel electrode 25 are aligned so as to be substantially orthogonal to a substrate plane.

Figure 2C:
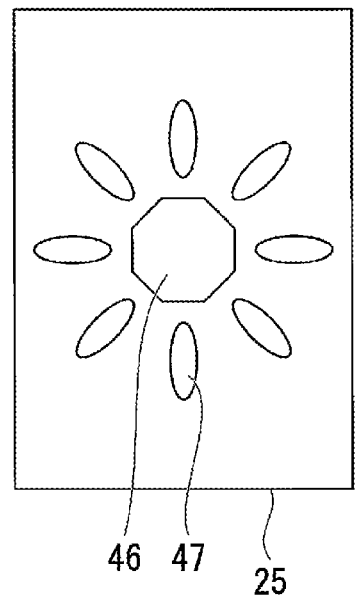
FIG. 2C is a plan view of the rivet structure 46 and a pixel electrode 25, illustrating in a simple manner the alignment state of the liquid crystal molecules near the rivet structure.

FIG. 2C is a plan view of the rivet structure and a pixel electrode, illustrating in a simple manner an alignment state of the liquid crystal molecules near the rivet structure.

As illustrated in FIG. 2C, the liquid crystal molecules 47 are aligned approximately equally around the rivet structure 46.

The rivet structure 46 in the present embodiment is substantially octagonal in plan view. Hence, in plan view, the liquid crystal molecules 47 are aligned substantially orthogonal to eight respective side wall faces 46a of the rivet structure 46.

Figure 2D:
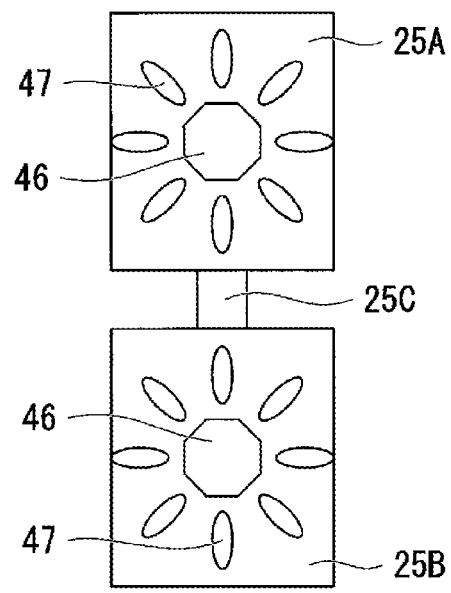
FIG. 2D is a diagram illustrating in a simple manner another configuration example of pixel electrodes 25 and rivet structures 46 and also an alignment state of the liquid crystal molecules 47 near each rivet structure.
Figure 2E:
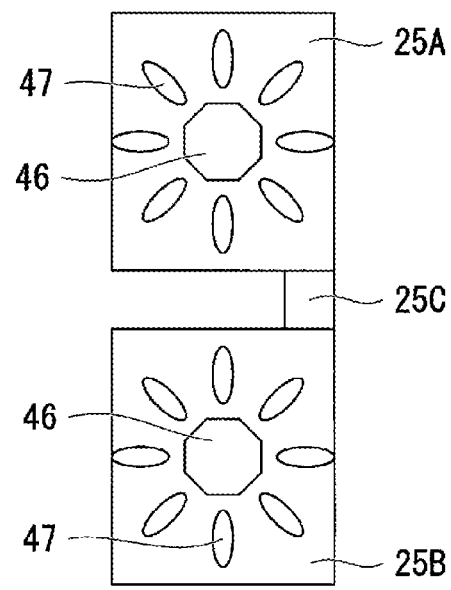
FIG. 2E is a diagram illustrating in a simple manner another configuration example of the pixel electrodes 25 and the rivet structures 46 and also an alignment state of the liquid crystal molecules 47 near each rivet structure.

FIG. 2D and FIG. 2E are diagrams each illustrating in a simple manner another configuration example of pixel electrodes and rivet structures and also an alignment state of the liquid crystal molecules near each rivet structure.

As illustrated in FIG. 2D and FIG. 2E, a configuration in which two pixel electrodes 25A and 25B are provided in one pixel and the rivet structure 46 is arranged in each of the pixel electrode 25A and 25B may be employed.

In this case, a connection part 25C connecting the pixel electrodes 25A and 25B may be positioned approximately at the respective centers of the pixel electrodes 25A and 25B as illustrated in FIG. 2D or may be positioned closer to respective one-side sides of the pixel electrodes 25A and 25B as illustrated in FIG. 2E. With such a configuration of sectioning each pixel, the alignment of the liquid crystal molecules 47 can be highly regulated, and hence an increase in response speed can be expected.

A photo-alignment film may be used as a first vertical alignment film 27. Subjecting the first vertical alignment film 27 to alignment treatment by using a photo-alignment technique allows the first vertical alignment film 27 to obtain alignment regulation force for vertically aligning the liquid crystal molecules 47 composing the liquid crystal layer 11.

Meanwhile, on the liquid crystal layer 11 side face of the transparent resin film substrate (base material) 29 that is part of the color filter substrate 12, a base coat 39, a black matrix 30, color filters 31, a flattened layer 32, counter electrodes 33, a second vertical alignment film 34 are sequentially formed.

As the transparent resin film substrate 29, material similar to that of the above-described transparent resin film substrate 14, for example, organic transparent resin material having heat resistance such as polyimide (PI), can be used.

The transparent resin film substrate 14 and the transparent resin film substrate 29 include organic transparent resin material having heat resistance such as polyimide (PI).

As the base coat 39, for example, an inorganic film such as a silicon nitride film (SiNx), a silicon oxynitride film (SiNO), or a silicon oxide film ($SiO_2$) is used.

The black matrix 30 has the function of blocking transmission of light through each inter-pixel region. The black matrix 30 includes metal, for example, chromium (Cr), a multilayer film of Cr/Cr oxide, or photoresist in which carbon particles are dispersed in photosensitive resin.

Each color filter 31 includes, for each of sub pixels having different colors serving as a single pixel, a color element of any of red (R), green (G), and blue (B). For each one pixel electrode 25 on the element substrate 10, the color filter 31 of any one of R, G, and B is arranged so as to face the pixel electrode 25. Note that the color filters 31 may have a multi-color configuration of more than three colors, R, G, and B.

For example, the color filters 31 may have a four-color configuration including yellow (Y) in addition to the above, a four-color configuration including white (W) in addition to the above, or a six-color configuration including yellow (Y), cyan (C), and magenta (M) in addition to the above.

The flattened layer 32 is composed of an insulating film covering the black matrix 30 and the color filters 31. The flattened layer 32 has the function of reducing and flattering the steps caused by the black matrix 30 and the color filters 31.

On the flattened layer 32, the counter electrode 33 is formed. As material of the counter electrode 33, transparent conductive material similar to that of the pixel electrodes 25 is used.

The second vertical alignment film 34 is formed on or over the entire face of the counter electrode 33. In the present example, the alignment of the liquid crystal molecules 47 is controlled by the plurality of rivet structures 46 thus provided. However, in a case of controlling the alignment of the liquid crystal molecules 47 by using the photo-alignment technique, a photo-alignment film is used for the vertical alignment film 34. In a case of using the photo-alignment technique, the rivet structures 46 are not needed.

As illustrated in FIG. 1, the backlight unit 8 includes a light source 36 and a light guide 37. The light source 36 is arranged at an end face of the light guide 37. As the light source 36, a light emitting diode, a cold-cathode tube, or the like is used, for example. The backlight unit 8 of the present embodiment is an edge light type backlight.

The light guide 37 has the function of guiding light emitted from the light source 36 toward the liquid crystal panel 2. As material for the light guide 37, resin material such as acrylic resin, for example, is used.

Light incident from the light source 36 on the end face of the light guide 37 is totally reflected in the interior of the light guide 37 and propagates and is then emitted from the upper face (light-emitting face) of the light guide 37 at an approximately uniform intensity. Although not illustrated in the present embodiment, a scattering sheet and a prism sheet are arranged on the upper face of the light guide 37, and a scattering sheet is arranged on the lower face of the light guide 37. The light emitted from the upper face of the light guide 37 is scattered by the scattering sheet, then concentrated by the prism sheet, approximately collimated, and then emitted. As the scattering sheet, white PET may be used. As the prism sheet, a BEF sheet (trade name) available from Sumitomo 3M Limited, for example, may be used.

In the present embodiment, the backlight unit 8 need not have directivity. As the backlight unit 8 of the present embodiment, a backlight which controls the light emission direction and in which directivity is set relatively gently, is used. In the present embodiment, the backlight unit 8 may have directivity.

The incident-side linear polarizing plate 4 is provided between the backlight unit 8 and the liquid crystal cell 5. The incident-side linear polarizing plate 4 functions as a polarizing plate for controlling a polarizing state of light incident on the liquid crystal cell 5.

The emission-side linear polarizing plate 6 functions as an analyzer for controlling a transparency state of light emitted from the liquid crystal cell 5. As will be described later, an absorption axis P1 of the incident-side linear polarizing plate 4 and an absorption axis P2 of the emission-side linear polarizing plate 6 have a crossed-Nicol arrangement.

Figure 3:
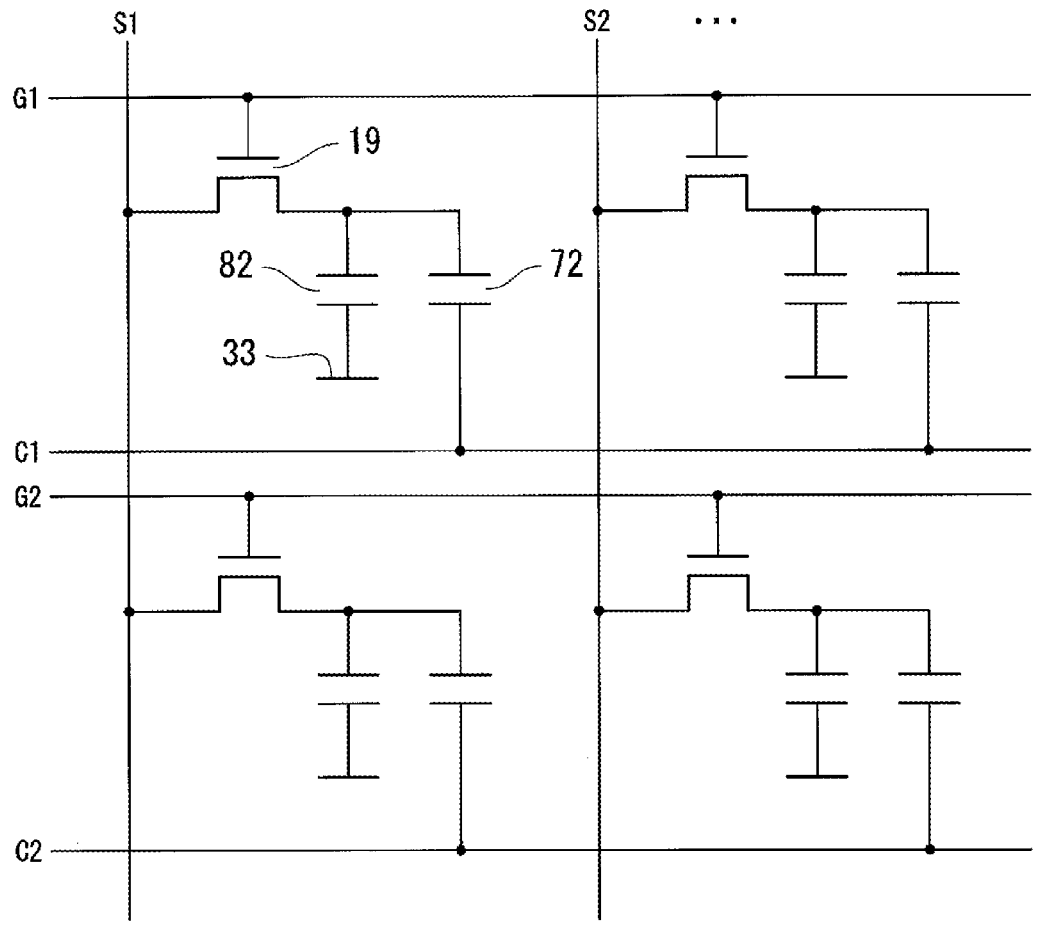
FIG. 3 is an equivalent circuit diagram in the display region of the liquid crystal panel 2.

FIG. 3 is an equivalent circuit diagram of the display region of the liquid crystal panel 2.

As illustrated in FIG. 3, a plurality of pixels PX are arranged in matrix on the element substrate 10. Each pixel PX is a basic unit of display. On the element substrate 10, a plurality of signal lines S1, S2, . . . are provided so as to extend in parallel with each other. On the element substrate 10, a plurality of scanning lines G1, G2, . . . are provided so as to extend in parallel with each other. The plurality of scanning lines G1, G2, . . . and the plurality of signal lines S1, S2, . . . are orthogonal to each other. On the element substrate 10, the plurality of scanning lines G1, G2, . . . and the plurality of signal lines S1, S2, . . . are provided in a lattice pattern.

The rectangular region sectioned by each two adjacent signal lines and each two adjacent scanning lines corresponds to one pixel PX. The signal lines S1, S2, . . . are connected to the source electrode 17 of the TFT element 19. The scanning lines G1, G2, . . . are connected to the gate electrode 16 of the TFT element 19.

On the element substrate 10, a plurality of capacitance lines C1, C2, . . . are formed so as to extend in parallel with the scanning lines G1 to G4. The TFT element 19, the storage capacitor 72, and a liquid crystal capacitor 82 are provided in each one pixel PX. The configuration of the storage capacitor 72 will be described later. The liquid crystal capacitor 82 is composed of the pixel electrode 25, the counter electrode 33, and the liquid crystal layer 11 held sandwiched therebetween.

Figure 4:
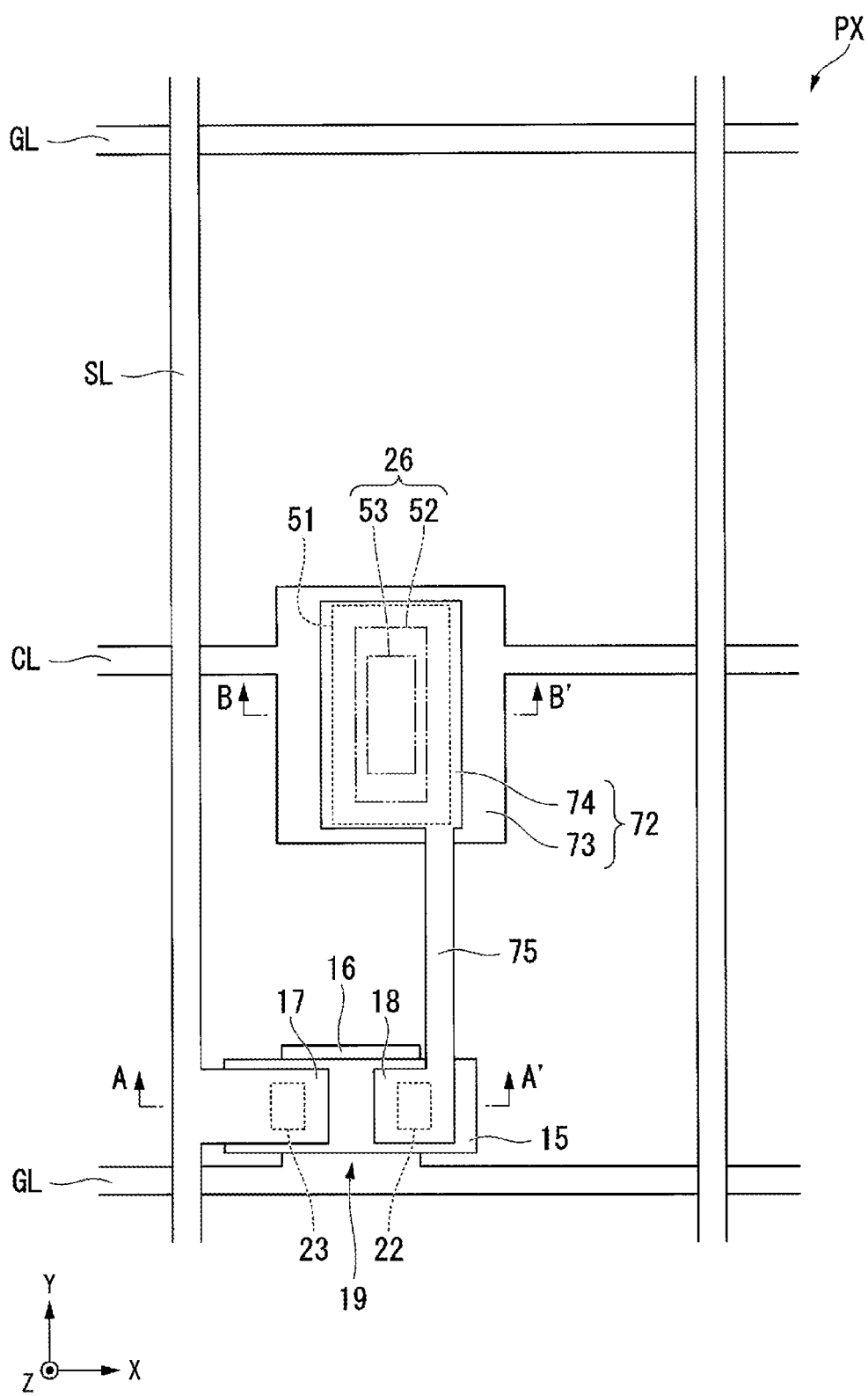
FIG. 4 is a plan view of one pixel PX of the liquid crystal panel 2.

FIG. 4 is a plan view of one pixel PX of the liquid crystal panel 2.

As illustrated in FIG. 4, the TFT element 19 is provided at an intersection positioned lower left of the one pixel PX among the plurality of intersections where the scanning lines (gate bus lines) GL and the signal lines (source bus lines) SL intersect. The gate electrode 16 is provided in the same layer as that of the gate bus lines GL and is provided integrally with the corresponding gate bus line GL so as to project from the gate bus line GL. The semiconductor layer 15 is provided so as to intersect with the gate electrode 16 seen from the normal direction of the element substrate 10. The source electrode 17 is provided in the same layer 0 as that of the source bus lines SL and is provided integrally with the corresponding source bus line SL so as to project from the source bus line SL. The source electrode 17 is provided so that the source electrode 17 partially overlaps the semiconductor layer 15. The drain electrode 18 is provided so that the drain electrode 18 partially overlaps the semiconductor layer 15.

As illustrated in FIG. 4, the capacitance line CL extending in a direction substantially parallel with the gate bus lines GL is provided substantially at the center of the pixel PX. The capacitance line CL is provided on the base coat 38 and is provided in the same layer as that of the gate bus lines GL. The first capacitance electrode 73 formed of part of the capacitance line CL is rectangular as seen from the normal direction of the element substrate 10 in plan view. As material of the first capacitance electrode 73, conductive material similar to that of the above-described gate electrode 16 is used.

On the first capacitance electrode 73, the second capacitance electrode 74 is provided so as to overlap the first capacitance electrode 73. The overlapping portion in which the first capacitance electrode 73 and the second capacitance electrode 74 overlaps functions as the storage capacitor 72. The second capacitance electrode 74 and the drain electrode 18 are formed in the same layer and are electrically connected to each other through the connection portion 75 integrally formed with the second capacitance electrode 74 and the drain electrode 18. The second capacitance electrode 7 is made of the same material as that of the drain electrode 18.

On the second capacitance electrode 74, the contact hole 26 is provided to electrically connect the second capacitance electrode 74 and the drain electrode 18 to the pixel electrode 25. Illustration of the contour lines of the pixel electrode 25 is omitted in FIG. 4 for the purpose of simplifying the drawing.

Figure 5:
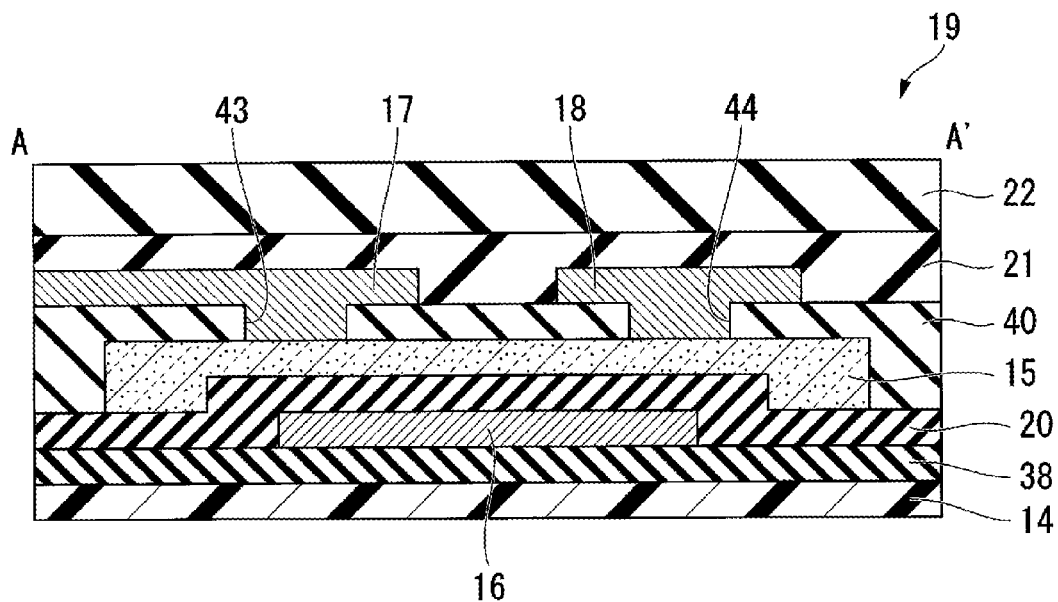
FIG. 5 is a cross-sectional view taken along line A-A' in FIG. 4.

FIG. 5 is a cross-sectional view taken along line A-A' in FIG. 4.

As illustrated in FIG. 5, in the TFT element 19, through-holes 43 and 44 are formed in the etching stopper layer 40 on the semiconductor layer 15 so as to penetrate the etching stopper layer by film thickness. The source electrode 17 is connected to the source region of the semiconductor layer 15 via the one through-hole 43, and the drain electrode 18 is connected to the drain electrode of the semiconductor layer 15 via the other through-hole 44. The pixel electrode 25 is connected to the drain region of the semiconductor layer 15 via the drain electrode 18 serving as a relay electrode. In the present embodiment, the configuration of including the etching stopper layer 40 is employed. However, to achieve higher resolution, a configuration of not including the etching stopper layer 40 may be employed.

Figure 6:
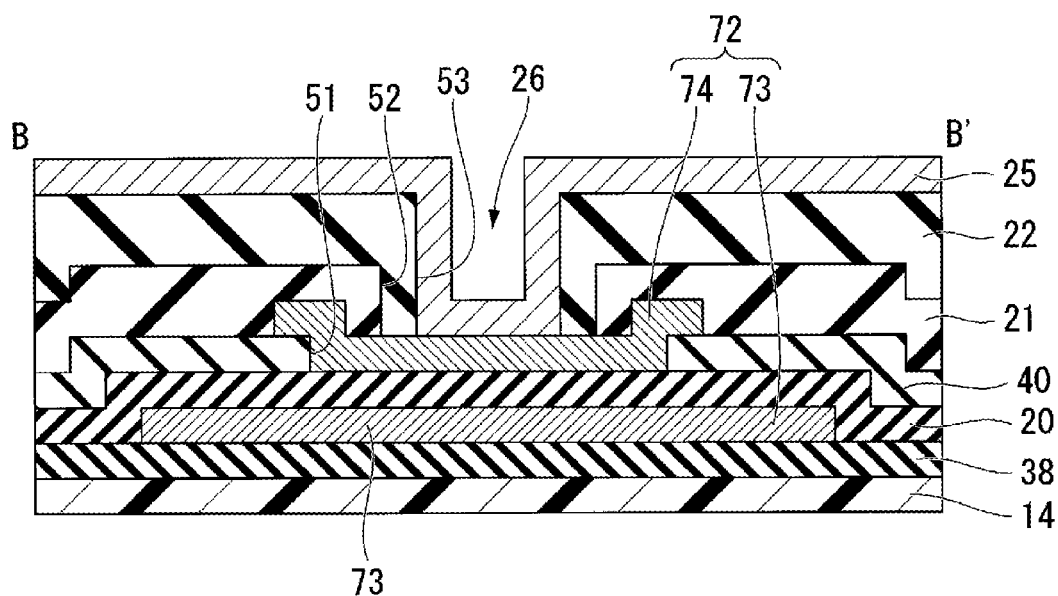
FIG. 6 is a cross-sectional view taken along line B-B' in FIG. 4.

FIG. 6 is a cross-sectional view taken along line B-B' in FIG. 4.

As illustrated in FIG. 6, in the storage capacitor 72, a through-hole 51 opening to the surface of the gate insulating film 20 is formed in the etching stopper layer 40 provided on the first capacitance electrode 73 with the gate insulating film 20 therebetween. In the through-hole 51, the second capacitance electrode 74 serving as the other electrode of the storage capacitor 72 is formed. A through-hole 52 and a through-hole 53 are respectively formed in the first interlayer insulating film 21 and the second interlayer insulating film 22 on the second capacitance electrode 74 so as to be open to the surface of the second capacitance electrode 74. In the present embodiment, the inner wall face of the through-hole 52 is covered by the inner wall face of the through-hole 53. The pixel electrode 25 on the second interlayer insulating film 22 is connected to the second capacitance electrode 74 via the contact hole 26 made by the through-holes 52 and 53.

Figure 7:
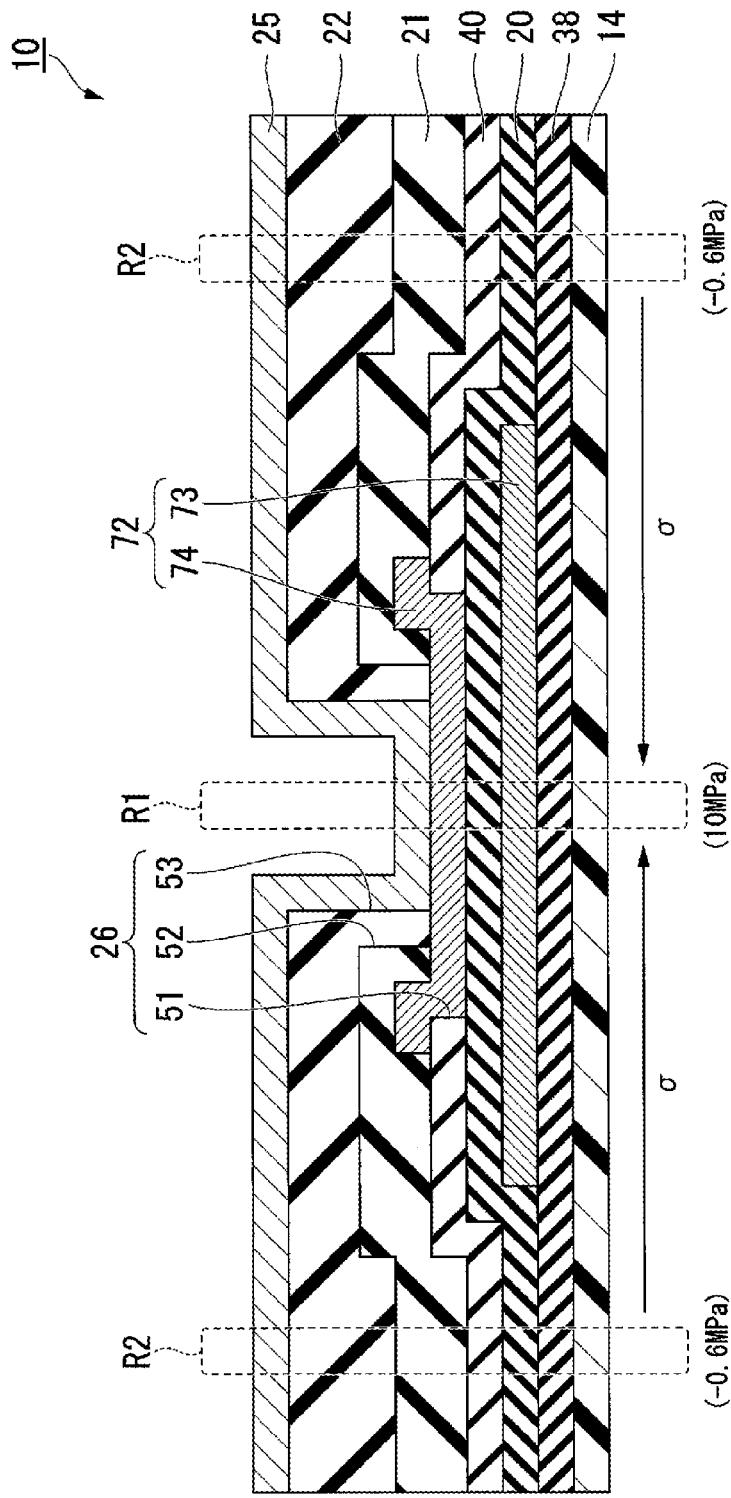
FIG. 7 is a cross-sectional view illustrating a structure of a storage capacitor 72 and near the storage capacitor 72 in the one pixel PX of the liquid crystal panel 2.

FIG. 7 is a cross-sectional view illustrating a structure of the storage capacitor 72 and near the storage capacitor 72 in the one pixel PX of the liquid crystal panel 2.

As illustrated in FIG. 7, in the present embodiment, there is a difference between the first region R1, where the contact hole 26 (the plurality of through-holes 51, 52, and 53) exist, and the second region R2, which is near the through-holes 51, 52, and 53 and is outside the storage capacitor 72, in the number of the plurality of insulating films layered on the transparent resin film substrate 14 or film thickness of the plurality of insulating films. Hence, the film stress is different between the first region R1 and the second region R2, which causes a difference in film stress in the plurality of insulating films in the element substrate 10 as a whole.

In Table 1, the difference in film thickness and the difference in film stress in the entirety of the plurality of insulating films between the first region R1 corresponding to the through-holes 51, 52, and 53 and the second region R2 near the through-holes 51, 52, and 53 (outside the storage capacitor 72) are shown.

TABLE 1

| | Contact hole portion | | Near contact hole | |
|---|---|---|---|---|
| | Stress (MPa) | Film thickness (nm) | Stress (MPa) | Film thickness (nm) |
| Transparent resin film substrate | 20 | 10000 | 20 | 10000 |
| Base coat | 260 | 320 | 260 | 320 |
| Gate insulating film | −450 | 380 | −450 | 380 |
| First interlayer insulating film (including etching stopper layer) | 0 | 0 | −400 | 450 |
| Second interlayer insulating film | 0 | 0 | 30 | 2000 |
| Total | 10 | 10800 | −0.6 | 13150 |

As seen from the above, the stress of each of the through-holes 51 and 52 formed of inorganic films has greater contribution than that of the through-hole 53 formed of organic insulating material.

Figure 8A:
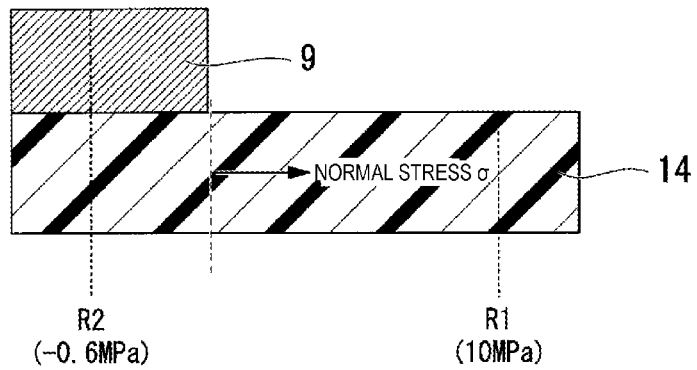
FIG. 8A is a diagram illustrating an ideal cross section at a boundary portion between a first region R1 and a second region R2.
Figure 8B:
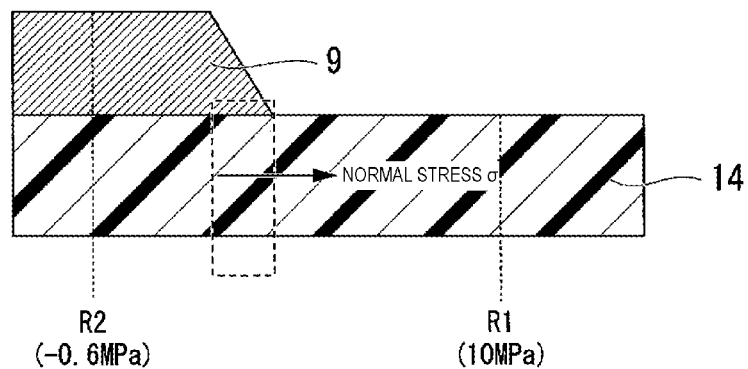
FIG. 8B is a diagram illustrating an actual cross section at the boundary portion between the first region R1 and the second region R2.

FIG. 8A is a diagram illustrating an ideal cross section at a boundary portion between the first region R1 and the second region R2 in a through-hole. FIG. 8B is a diagram illustrating an actual cross section at the boundary portion between the first region R1 and the second region R2. The reference sign 9 in FIG. 8A and FIG. 8B indicates a multilayer film including the base coat 38, the gate insulating film 20, the first interlayer insulating film 21, the second interlayer insulating film 22, and the like layered on the transparent resin film substrate 14.

As illustrated in FIG. 8A, the ideal cross section at the boundary portion between the first region R1 and the second region R2 is a cross section in the vertical direction with respect to the transparent resin film substrate 14. Although the actual cross section does not match the ideal cross section in the vertical direction with respect to the transparent resin film substrate 14 due to a taper angle formed in a manufacturing process, a plurality of insulating films, or the like, as illustrated in FIG. 8B, normal stress σ at the boundary between the first region R1 and the second region R2 is regarded as the difference in film stress between the first region R1 and the second region R2 as in a case of the ideal cross section illustrated in FIG. 8A, since the film thickness continuously changes.

The normal stress σ occurring due to the film stress of the plurality of insulating films acts on the wall face of the contact hole 26. Here, the normal stress σ in the present embodiment is defined as follows.

Normal stress σ: "normal stress acting on a cross section perpendicularly joining the boundary between the first region R1 and the second region R2 and the resin film substrate (wall face of the through-hole)"

Next, a relationship between the directions in which the normal stress acts on the wall face of the contact hole 26 and the absorption axes P1 and P2 of the polarizing plates 4 and 6 will be described.

Figure 9:
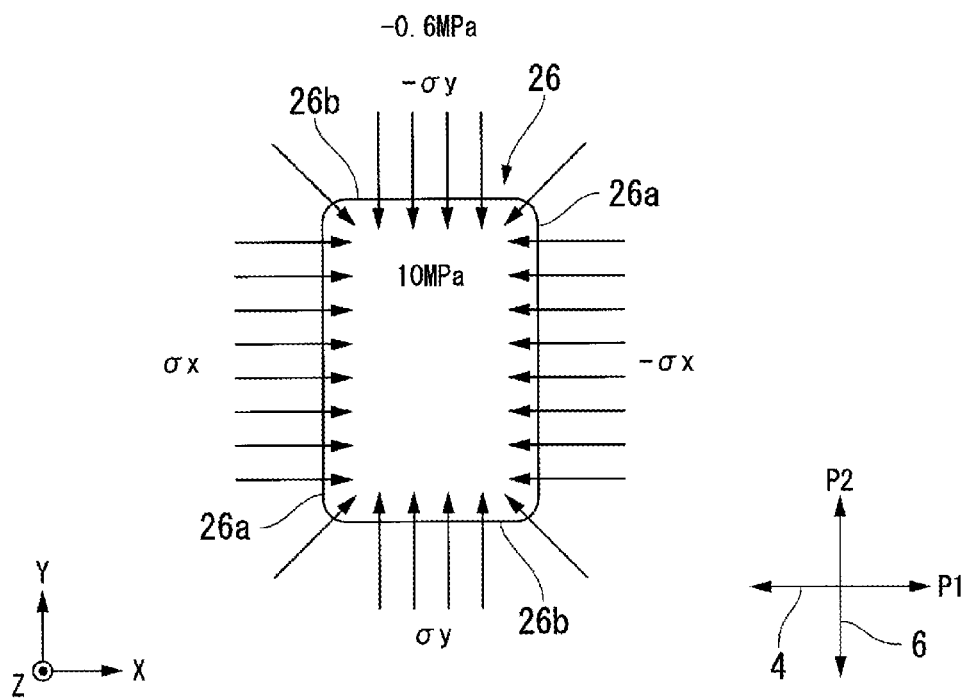
FIG. 9 is a plan view illustrating a relationship between directions of normal stress acting on a contact hole 26 and directions of an absorption axis of an incident-side linear polarizing plate 4 and an absorption axis of an emission-side linear polarizing plate 6.

FIG. 9 is a plan view illustrating a relationship between the directions of the normal stress σ acting on the contact hole 26 and directions of the absorption axis P1 of the incident-side linear polarizing plate 4 and the absorption axis P2 of the emission-side linear polarizing plate 6.

In FIG. 9, the directions of the normal stress σ acting on the wall face of the contact hole 26 due to the difference in film stress between the first region R1 and the second region R2 are indicated by arrows. Here, the tip side of each arrow corresponds to the plus side in the provided XYZ coordinate system.

As illustrated in FIG. 9, in a case where the shape of the contact hole 26 seen from a plane-normal direction of the element substrate 10 in plan view is rectangular, stress acts in the directions orthogonal to the sides 26a and 26b. Even though the contact hole 26 is rectangular in plan view in design, stress acts in the vertical direction at each of four vertex portions rounded through etching in a panel manufacturing process.

In a transmissive panel (vertical alignment mode, horizontal alignment mode), the absorption axes P1 and P2 of the incident-side linear polarizing plate 4 and the emission-side linear polarizing plate 6 are orthogonal to each other. Each of the sides (long sides 26a and short sides 26b) of the contact hole 26 is in parallel with a corresponding one of the absorption axes P1 and P2.

In other words, the direction of the absorption axis P1 of the incident-side linear polarizing plate 4 and the vertical direction in which stress acts on the long sides 26a of the contact hole 26 are matched, and the direction of the absorption axis P2 of the emission-side linear polarizing plate 6 and the vertical direction in which stress acts on the short sides 26b of the contact hole 26 are matched. Conversely, the direction of the absorption axis P1 of the incident-side linear polarizing plate 4 and the vertical direction in which stress acts on the short sides 26b of the contact hole 26 may be matched, and the direction of the absorption axis P2 of the emission-side linear polarizing plate 6 and the vertical direction in which stress acts on the long sides 26a of the contact hole 26 may be matched.

By actually manufacturing a liquid crystal panel using a resin film as substrate material, occurrence of light leakage in black display is found around each contact hole 26. A cause of the light leakage is due to the difference in the number of insulating films layered on the transparent resin film substrate 14 between the first region R1 corresponding to the contact hole 26 and the second region R2 near the contact hole 26 (region outside the contact hole 26 and being different from the first region R1 in the number of insulating films and film thickness), and this consequently causes a difference in film stress in the plurality of insulating films as a whole.

Specifically, as illustrated in FIG. 9, the film stress applied to the first region R1 corresponding to the contact hole 26 is 10 MPa, and the film stress applied to the second region R2 near the contact hole 26 is −0.6 MPa.

Hence, light leakage occurs due to retardation attributable to a stress difference at the wall face of the contact hole 26.

Retardation δ=C (photoelastic coefficient)*d (film thickness of elastic body)*σ (stress)

Although the transparent resin film substrates 14 and 29, which are thin, light, and flexible, are useful to achieve light weight and improve diversity of the liquid crystal display device 1. However, since the photoelastic coefficient is greater than that of organic glass (several ten times to several hundred times), light leakage occurs as described above.

In view of this, the liquid crystal display device 1 of the present embodiment has a configuration that, in the liquid crystal panel 2 using the transparent resin film substrates 14 and 29, the respective absorption axes P1 and P2 of the incident-side linear polarizing plate 4 and the emission-side linear polarizing plate 6 are matched with the directions in which the normal stress acting on the cross section of the transparent resin film substrates 14 and 29 and the plurality of insulating films acts on the largest range, by the difference in the number of layers of the insulating films in part of the element substrate 10. In other words, as illustrated in FIG. 9, the normal stress acting on each long side 26a of the contact hole 26 is greater than that acting on each short side 26b of the contact hole 26. Hence, either of the absorption axes P1 and P2 of the paired polarizing plates 4 and 6 is matched with the extending direction of the long sides 26a on which the greater normal stress acts. With this configuration, it is possible in black display to suppress occurrence of light leakage near the contact hole 26 (second region R2).

Here, in particular, either of the absorption axes P1 and P2 of the paired polarizing plates 4 and 6 is preferably matched with the extending direction of the long sides of the through-holes 51 and 52 formed of inorganic films.

This also applies to the case of adopting a channel etched type TFT. In this case, the etching stopper layer 40 is not needed.

Second Embodiment

Next, a liquid crystal display device of a second embodiment of the disclosure will be described.

Figure 10:
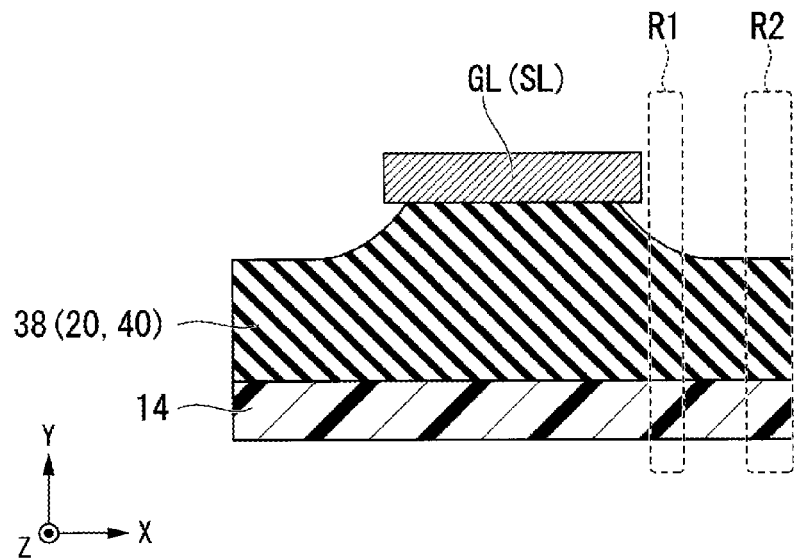
FIG. 10 is a cross-sectional view illustrating effects of side etching at an interface between a gate bus line GL and a gate insulating film 20.
Figure 11:
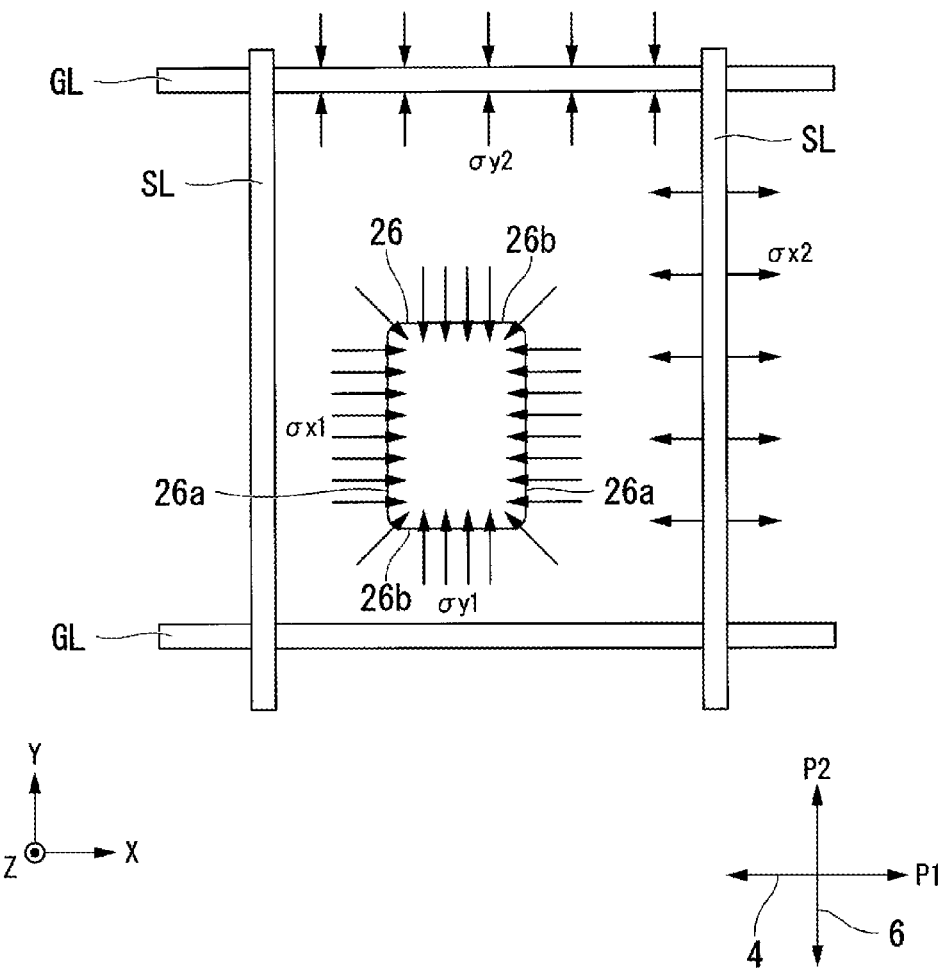
FIG. 11 is a diagram illustrating a relationship of normal stress occurring on a gate bus line GL side and normal stress occurring on a source bus line SL side, long sides and short sides of the contact hole 26, and the respective absorption axes of the incident-side linear polarizing plate 4 and the emission-side linear polarizing plate 6.

FIG. 10 is a cross-sectional view illustrating effects of side etching at an interface between the gate bus line GL and the base coat 38 and also a cross-sectional view illustrating effects of side etching at an interface between the source bus line SL and the gate insulating film 20. FIG. 11 is a diagram illustrating a relationship of normal stress occurring on the gate electrode 16 side and normal stress occurring on the source electrode 17 side, the long sides 26a and the short sides 26b of the contact hole 26, and the respective absorption axes P1 and P2 of the incident-side linear polarizing plate 4 and the emission-side linear polarizing plate 6.

As illustrated in FIG. 10, in forming the gate bus lines GL by etching in a process of manufacturing the element substrate 10, the base coat 38, which is the layer below, is also etched. In the example in FIG. 10, a portion, of the base coat 38, below the gate bus line GL is less likely to be etched (although side-etched) as indicated as a first region R1 since there is the gate bus line GL. However, a portion of, gate metal, positioned above a second region R2, which is away from the gate bus line GL is entirely etched, and hence, a portion, of the base coat 38, which is the layer below, is also etched, consequently reducing the film thickness of the second region R2 in comparison with that of the first region R1.

Also, in forming the source bus line SL by etching, similar to the case of gate bus line formation, a corresponding portion of the gate insulating film 20, which is the layer below, is also etched (in a case of using no etching stopper layer). In a case of using an etching stopper layer, the layer below the source bus lines SL is the etching stopper layer, and the reference sign 20 in FIG. 10 is replaced with a reference sign 40. In this case, effects of the side etching due to the gate bus lines GL and the source bus lines SL causes a continuous difference in thickness of the gate insulating film 20 at the interface between the gate insulating film 20 and each of the gate bus lines GL and the source bus lines SL (each portion surrounded by broken lines in FIG. 10). In other words, the continuous change in film stress in the gate insulating film 20 causes a difference in stress between a portion with the greatest film thickness and a portion with the smallest film thickness, which consequently causes light leakage.

The first region R1 in the present embodiment is at least either one of the region corresponding to the periphery of the gate bus line GL and the region corresponding to the periphery of the source bus line SL, and the second region R2 is a region adjacent to the first region R1 with a smaller film thickness than that of the first region R1.

The element substrate 10 includes the gate bus lines GL and the source bus lines SL orthogonal to each other, and thus the directions in which the normal stress σ due to the effects of the side etching occurs correspond to the X direction and the Y direction.

Accordingly, as illustrated in FIG. 11, by matching the extending directions of the gate bus lines GL and the source bus lines SL with the extending directions of the long sides 26a and the short sides 26b of the contact hole 26 rectangular in plan view and also with the directions of the absorption axes P1 and P2 of the incident-side linear polarizing plate 4 and the emission-side linear polarizing plate 6, occurrence of light leakage in the extending directions of the gate bus lines GL and the source bus lines SL can be effectively suppressed.

Third Embodiment

Next, a liquid crystal display device of a third embodiment of the disclosure will be described.

Figure 12A:
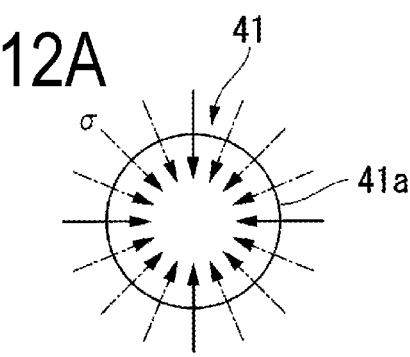
FIG. 12A is a diagram illustrating a relationship between normal stress acting on a contact hole that is circular in plan view and the directions of the respective absorption axes of the incident-side linear polarizing plate and the emission-side linear polarizing plate.
Figure 12A:
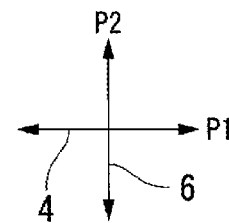
Figure 12B:
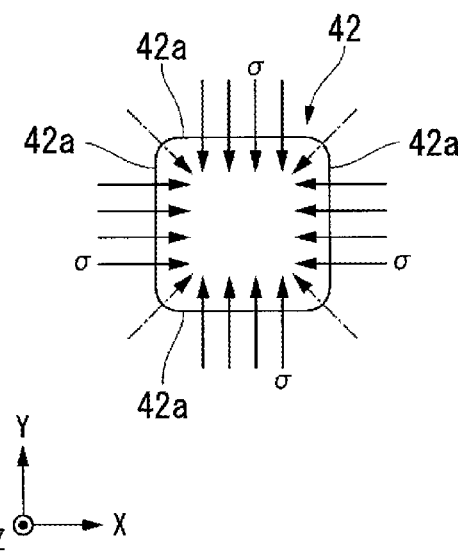
FIG. 12B is a diagram illustrating a relationship between normal stress acting on a through-hole that is square in plan view and the directions of the respective absorption axes of the incident-side linear polarizing plate and the emission-side linear polarizing plate.
Figure 12B:
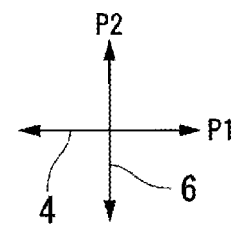

FIG. 12A is a diagram illustrating a relationship between the normal stress σ acting on a contact hole 41 circular in plan view and the directions of the absorption axes P1 and P2 of the incident-side linear polarizing plate 4 and the emission-side linear polarizing plate 6. FIG. 12B is a diagram illustrating a relationship between the normal stress σ acting on a contact hole 42 square in plan view and the directions of the absorption axes P1 and P2 of the incident-side linear polarizing plate 4 and the emission-side linear polarizing plate 6.

Although each contact hole rectangular in plan view has been described in the former embodiments, the shape of each contact hole in plan view is not limited to a rectangular shape.

However, in a case of the contact hole 41 circular in plan view as illustrated in FIG. 12A, most of the normal stress σ acting on the circumference 41a of the contact hole 41 does not match the directions of the absorption axes P1 and P2 of the polarizing plates 4 and 6. Accordingly, it is difficult to suppress light leakage effectively.

In contrast, in a case of the contact hole 42 square in plan view as illustrated in FIG. 12B, sides 42a are linear, and hence most of the normal stress σ acting on the sides 42a can be matched with the directions of the absorption axes P1 and P2 of the polarizing plates 4 and 6, and hence light leakage can be effectively suppressed.

Next, a description will be given of verification of validity of one aspect of the disclosure.

Figure 13A:
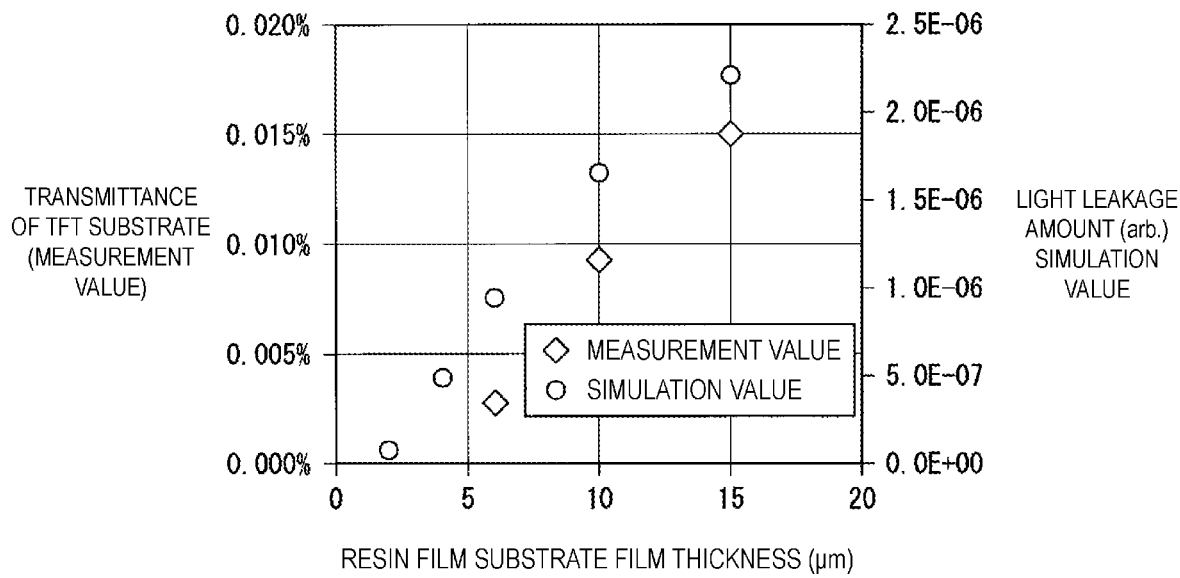
FIG. 13A is a graph illustrating comparison between measurement values of transmittance of an element substrate and simulation values of light leakage.

FIG. 13A is a graph illustrating comparison between measurement values of transmittance of the element substrate 10 and simulation values of light leakage.

In a case where a double refractor is placed between the polarizing plates 4 and 6 in a crossed-Nicol state, the intensity of the transmittance can be expressed by Equation (1) below.

$$I(\lambda) \propto \sin^2(2\theta) * \sin^2(\pi * \delta/\lambda) \tag{1}$$

θ: angle between absorption axes of polarizing plate and double refractor
δ: retardation Equation (1) above is obtained based on NPL 1, Materials for Display, The Society of Polymer Science, Japan (ed.), Kyoritsu Shuppan Co., Ltd. (publisher), Mitsuaki Nanjo, Chapter 1, pp. 9-10.

The retardation occurring in photoelastic double refraction can be expressed by Equation (2) below.

$$\delta = C * \sigma * d \tag{2}$$

C (/Pa): photoelastic coefficient
σ (Pa): principal stress difference
d (m): thickness The result obtained through simulation (calculation) of the amount of light leakage attributable to photoelastic double refraction in preparing an element substrate by using a transparent resin film substrate is illustrated in FIG. 13A. Here, the photoelastic coefficient of the resin film substrate is assumed to be $13*10^{-12}$/Pa. The model presented in Table 1 is used for the calculation of the stress (σ). By substituting the values for Equation (2), the retardation δ occurring at the boundary of the through-hole can be calculated.

By substituting the retardation δ calculated according to Equation (2) for Equation (1), the amount of light leakage (arb.) from the element substrate present between the polarizing plates in the crossed-Nicol state can be roughly estimated. Here, the calculation was performed assuming that the wavelength λ is 550 nm.

The simulation result of the amount of light leakage (arb.) for each film thickness of the transparent resin film substrate is represented by circles (○) in FIG. 13A. The transmittance at the time of sandwiching the actually prepared element substrate by the polarizing plates in the crossed-Nicol state is represented by diamonds (◇). The smaller the film thickness of the resin film substrate becomes, the lower the transmittance (measurement value) becomes. This tendency is similar to the amount of light leakage obtained through simulation (calculation values obtained by using the model). Hence, this confirms the validity of the one aspect of the disclosure.

Next, to demonstrate the effects of the one aspect of the disclosure, the transmittance was measured by sandwiching the liquid crystal panel using a transparent resin film as a substrate between paired crossed-Nicol polarizing plates.

Figure 13B:
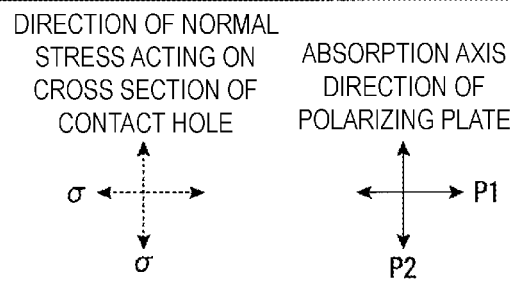

The comparison between measurement values obtained under different conditions provided that each measurement value is one in a case of using circular polarizers is presented in FIG. 13B.

Circular polarizer: The black transmittance ratio in an element substrate is assumed to be 1.0, and the contrast ratio of a liquid crystal panel in a vertical alignment (VA) mode is assumed to be 1.0, in a configuration that the directions of the normal stress acting on the wall face of the contact hole and the absorption axes of the polarizing plates match.

Linear polarizing plate: in a case of a configuration that the directions of the normal stress acting on the wall face of the contact hole and the absorption axes of the polarizing plates were not matched, no change occurred in black transmittance ratio and no reduction effects in light leakage was confirmed.

In contrast, in a case of the configuration that the directions of the normal stress acting on the wall face of the contact hole and the absorption axes of the polarizing plates were matched, the black transmittance ratio was approximately 0.3 times of that of the circular polarizers, and reduction effects in light leakage could be confirmed. Furthermore, the contrast in the liquid crystal panel is approximately 2.4 times of that of the case using the circular polarizers, which demonstrates improvement in display quality.

The demonstration experiment was performed by using the liquid crystal panel in the vertical alignment (VA) mode. However, a liquid crystal panel in any liquid crystal mode (horizontal alignment mode, twisted nematic (TN) alignment mode) can be used. In other words, the light leakage attributable to the difference in film stress caused by the difference in the number of layers of the insulating films in the liquid crystal panel is a major issue in a case of using, as a substrate, a resin film having a photoelastic coefficient greater (several ten to several hundred times) than that of inorganic glass. In view of this, by matching the directions of the normal stress acting on the wall surface of the contact hole with the absorption axes of the linear polarizing plates, the light leakage in question can be effectively reduced.

Fourth Embodiment

Next, a liquid crystal display device of a fourth embodiment of the disclosure will be described.

Figure 14:
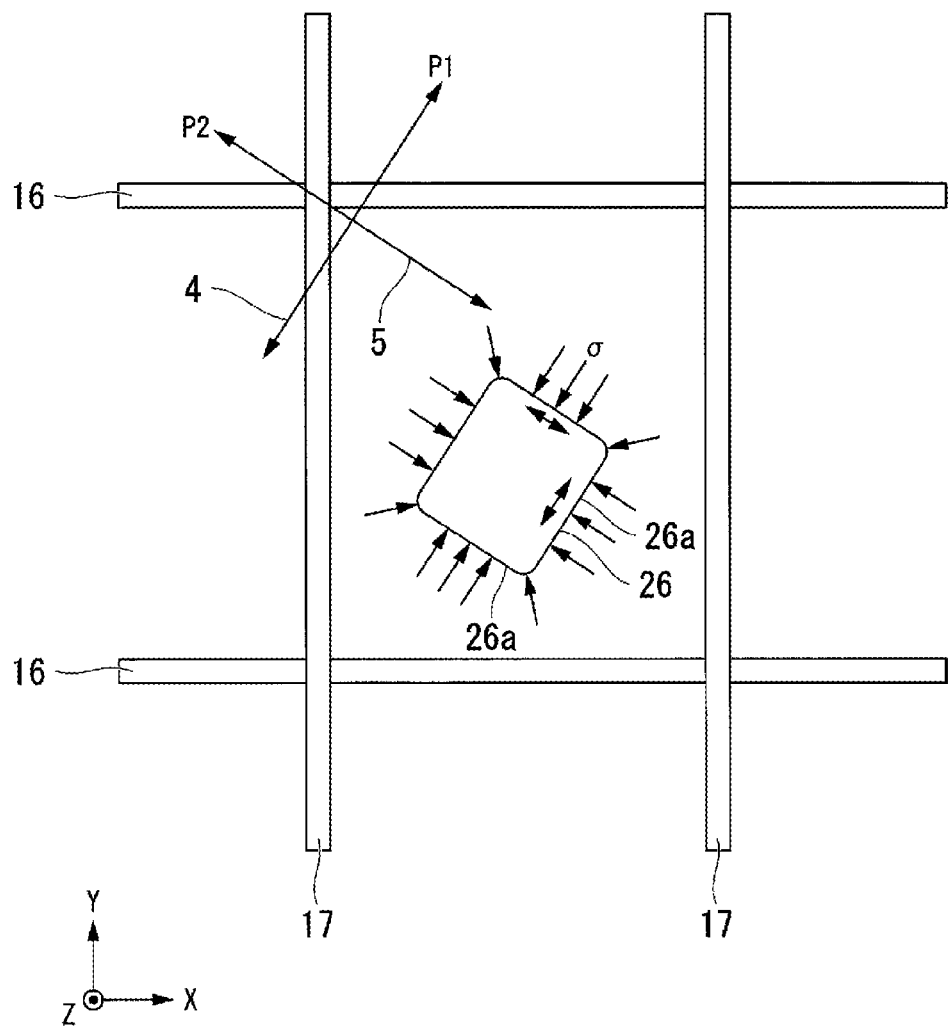
FIG. 14 is a plan view illustrating a configuration in which the through-hole is arranged obliquely with respect to the gate bus lines and the source bus lines.

FIG. 14 is a plan view illustrating a configuration in which the contact hole 26 is arranged obliquely with respect to the gate bus lines GL and the source bus lines SL.

As illustrated in FIG. 14, in the present embodiment, the contact hole 26 is arranged obliquely with respect to the gate electrode 16 and the source electrode 17. Also, in the incident-side linear polarizing plate 4 and the emission-side linear polarizing plate 6 in crossed-Nicol arrangement, the absorption axes P1 and P2 are arranged obliquely with respect to the gate electrode 16 and the source electrode 17. In this way, a configuration is made so that the four sides of the contact hole 26 (e.g., long sides 26a and short sides 26b) are parallel with the absorption axes P1 and P2 of the polarizing plates 4 and 6, and the directions of most of the normal stress σ acting on the wall surface of the contact hole 26 are matched with the absorption axes P1 and P2 in the plane-normal direction (Z direction) of the element substrate.

Also, with the configuration of the present embodiment, it is possible in black display to suppress occurrence of light leakage near the contact holes 26.

To manufacture the liquid crystal display device according to any of the above-described embodiments, the technique in JP 2013-145808 A may be adopted, for example.

In a case of preparing a liquid crystal panel by using material described in Photonics Polymers (Kyoritsu Shuppan Co., Ltd.) in obtaining a liquid crystal display device, light leakage due to stress in the interior of the panel can be suppressed by applying any of the above-described embodiments.

For example, by applying any of the above-described embodiments to the flexible device described in JP 2015-138895 A and the display element described in JP 2014-170686 A, stress in the interior of the device or the display element can be effectively suppressed, and hence this is effective to suppress light leakage.

Preferred embodiments of the disclosure have been described above with reference to the attached drawings, but it goes without saying that the disclosure is not limited to these examples. It will be clear to a person skilled in the art that various modifications and amendments can be imagined within the scope of the technical ideas described in the Scope of the Patent Claims, and it is understood that these modifications and amendments also obviously fall under the technical scope of the disclosure.

INDUSTRIAL APPLICABILITY

An aspect of the disclosure can be applied to a liquid crystal display device and the like capable of suppressing stress in an interior of a liquid crystal panel occurring in a case of using a resin film for a substrate of the liquid crystal panel.

REFERENCE SIGNS LIST

1 Liquid crystal display device
2 Liquid crystal panel
4 Incident-side linear polarizing plate
6 Emission-side linear polarizing plate
10 Element substrate
11 Liquid crystal layer
12 Color filter substrate (counter substrate)
14, 29 Transparent resin film substrate (base material)
16 Gate electrode
17 Source electrode
21 First interlayer insulating film (one of plurality of insulating films)
22 Second interlayer insulating film (one of plurality of insulating films)
40 Etching stopper layer (one of plurality of insulating films)
26 Contact hole
25 Pixel electrode
51, 52, 53 Through-hole
P1 Absorption axis of incident-side linear polarizing plate
P2 Absorption axis of emission-side polarizing plate
R1 First region
R2 Second region
GL Gate bus line
SL Source bus line

The invention claimed is:

1. A liquid crystal display device comprising:
   a liquid crystal panel including:
      an element substrate,
      a counter substrate facing the element substrate,
      a liquid crystal layer sandwiched between the element substrate and the counter substrate,
      an incident-side linear polarizing plate arranged on a light-incident side of the liquid crystal layer, and
      an emission-side linear polarizing plate arranged on a light-emission side of the liquid crystal layer, wherein
   the element substrate includes a resin film as a base material,
   a plurality of insulating films, a plurality of gate bus lines, and a plurality of source bus lines are defined on the base material,
   a contact hole is defined in the plurality of insulating films, the contact hole being rectangular in a plan view and arranged obliquely with respect to the plurality of gate bus lines and the plurality of source bus lines, and
   either a long side or a short side of the contact hole is parallel with an absorption axis of the incident-side linear polarizing plate or the emission-side linear polarizing plate.

2. The liquid crystal display device according to claim 1, wherein
   the contact hole includes a plurality of through-holes defined in the plurality of insulating films, and at least one of the plurality of through-holes is made of an inorganic film.

3. The liquid crystal display device according to claim 1, wherein storage capacitance is defined in the contact hole.

4. The liquid crystal display device according to claim 1, wherein the liquid crystal layer is in a horizontal alignment mode.

5. The liquid crystal display device according to claim 1, wherein the liquid crystal layer is in a vertical alignment mode.

\* \* \* \* \*